United States Patent [19]
Katz et al.

[11] 3,979,058
[45] Sept. 7, 1976

[54] OPERATOR PROMPTING SYSTEM FOR STORED PROGRAM CALCULATOR

[75] Inventors: Ronald. C. Katz, Indian Head Park; Aaron Aronson; Clarence Turek, both of Glenview, all of Ill.

[73] Assignee: Specialized Electronics Corporation, Chicago, Ill.

[22] Filed: Mar. 17, 1975

[21] Appl. No.: 559,062

Related U.S. Application Data

[63] Continuation-in-part of Ser. No. 518,728, Oct. 29, 1974.

[52] U.S. Cl............................ 235/156; 340/172.5
[51] Int. Cl.² ..................... G06F 9/18; G06F 15/02
[58] Field of Search........................... 235/152, 156; 340/172.5

[56] References Cited
UNITED STATES PATENTS

| | | | |
|---|---|---|---|
| 3,573,749 | 4/1971 | Smith et al. | 340/172.5 |
| 3,596,256 | 7/1971 | Alpert et al. | 340/172.5 |
| 3,686,637 | 8/1972 | Zachar et al. | 340/172.5 |
| 3,760,171 | 9/1973 | Wang et al. | 235/156 |
| 3,863,060 | 1/1975 | Rode et al. | 235/156 |

*Primary Examiner*—Jerry Smith
*Attorney, Agent, or Firm*—Leydig, Voit, Osann, Mayer & Holt, Ltd.

[57] ABSTRACT

An operator prompting system for a calculator of the type having stored program control for performing a limited number of pre-programmed calculations, the prompting system being adapted to guide an operator through the different programs by directly indicating the need for a data entry and the nature of such entry. In a preferred embodiment, the calculator display is of the alpha-numeric variety, and means are provided for driving the display to directly indicate upon such display the nature of the data required. The program module within the calculator may be configured to carry out complex calculations in various specialized fields, such as navigational, financial, scientific or engineering, the alpha-numeric display being used to display the numerical data as entered and the results, and also to directly call for the data required for the different programs or uses.

9 Claims, 3 Drawing Figures

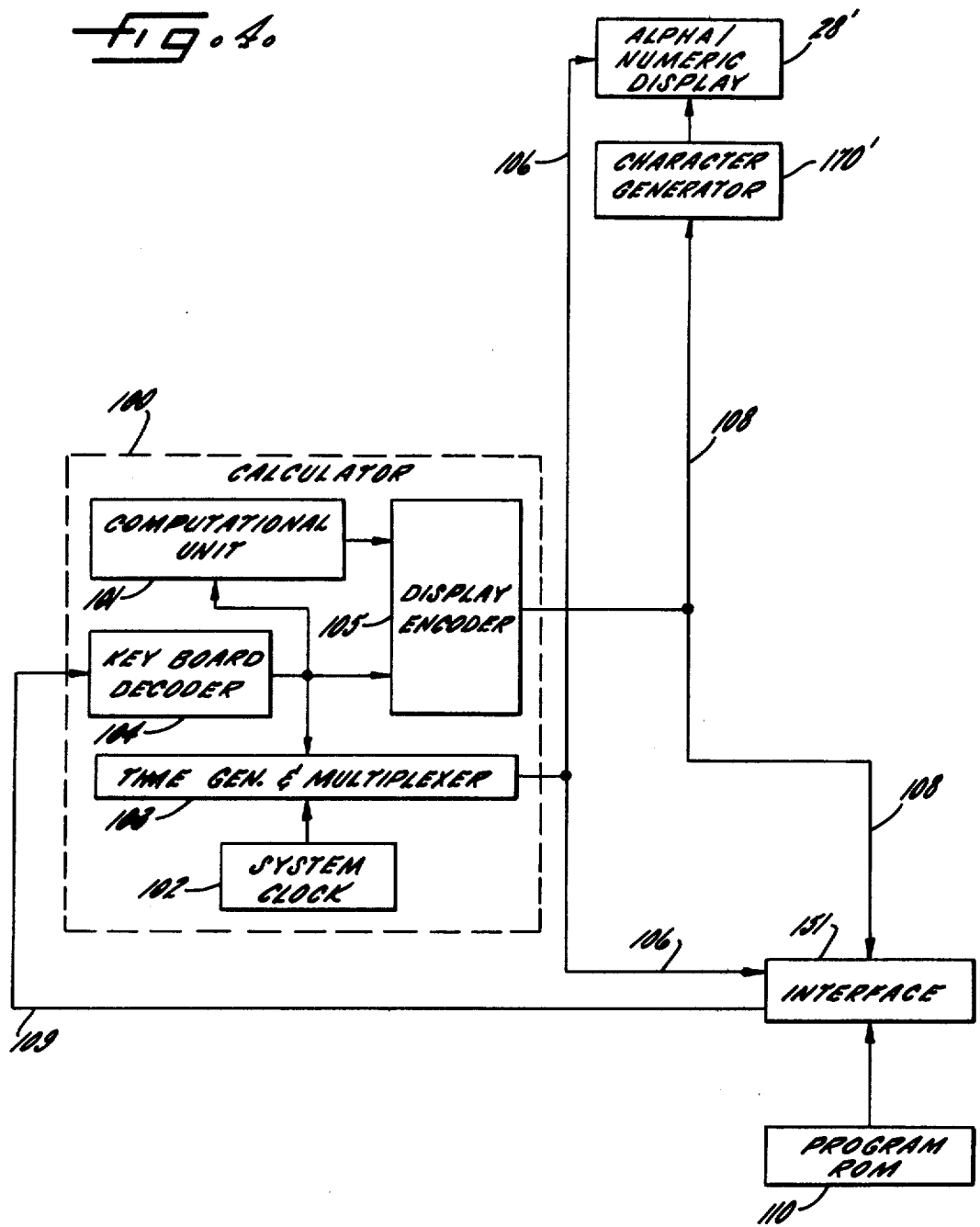

OPERATOR PROMPTING SYSTEM FOR STORED PROGRAM CALCULATOR

This application is a continuation-in-part of our co-pending application Ser. No. 518,728, filed Oct. 29, 1974.

This invention relates to special purpose programmed calculators, and more particularly to such calculators having operator cueing means for guiding an operator through the computational programs within the repertoire of the calculator.

Our prior application, cross referenced above, discloses our invention embodied in a hand held calculator with a limited stored program capability and having data entry indicators driven in response to the stored program for cueing the operator as to the need for a data entry and the nature of such entry. A specific embodiment of our invention is described therein as a navigational computer programmed to solve a plurality of navigational and performance related problems particularly of concern to aircraft pilots. Cueing is accomplished by a plurality of prompting lights, respective lights being associated with legends having the various types of data required in performance of the programmed calculation. The stored program is effective to illuminate a selected data entry light at the point in the program where such data is needed, indicating to the operator not only the fact that data is needed but the particular nature of such data.

This application supplements the disclosure of our copending application and is directed to a further form of programmed special purpose calculator employing the broad concept disclosed therein of program operated direct cueing means for guiding the operator through the computational programs within the repertoire of the calculator.

Among the features of the programmed calculator herein shown is simplicity in keyboard arrangement achieved by utilizing the LED display of the calculator for displaying both numerical data and the titles designating the nature of the input entries required for each successive step of a programmed calculation. With the display serving both functions a separate section on the keyboard devoted to prompting lights and associated printed titles is no longer required, thus saving keyboard space which may be utilized for additional program selector keys for further stored programs, thus enchancing the applications for the calculator, or for reorganizing the keyboard layout, without increasing the overall keyboard size. While the alpha-numeric display and programmed chip semiconductor components are more complex and somewhat more costly in such a calculator unit, total manufacturing cost is reduced due to the simpler keyboard arrangement while providing a unit with a fully functional direct cueing system to facilitate manual operation whether programmed for complex, multi-step navigational, mathematical, scientific, engineering, financial or other formulistic calculations.

Other objects and advantages will become apparent from the following detailed description, when taken in conjunction with the drawings, in which:

FIG. 3 is a block diagram of a modified display portion of the calculator of FIG. 2 adapted to display both calculated results and data titles on a single readout;

FIG. 4 is a block diagram of a further modified display portion of the calculator of FIG. 2.

While the invention will be described in connection with certain preferred embodiments, it will be understood that there is no intent to limit it to those embodiments. On the contrary, the intent is to cover all alternatives, modifications and equivalents included within the spirit and scope of the invention as defined by the appended claims.

PROGRAMMED CALCULATOR WITH OPERATOR CUEING

Figure 1:
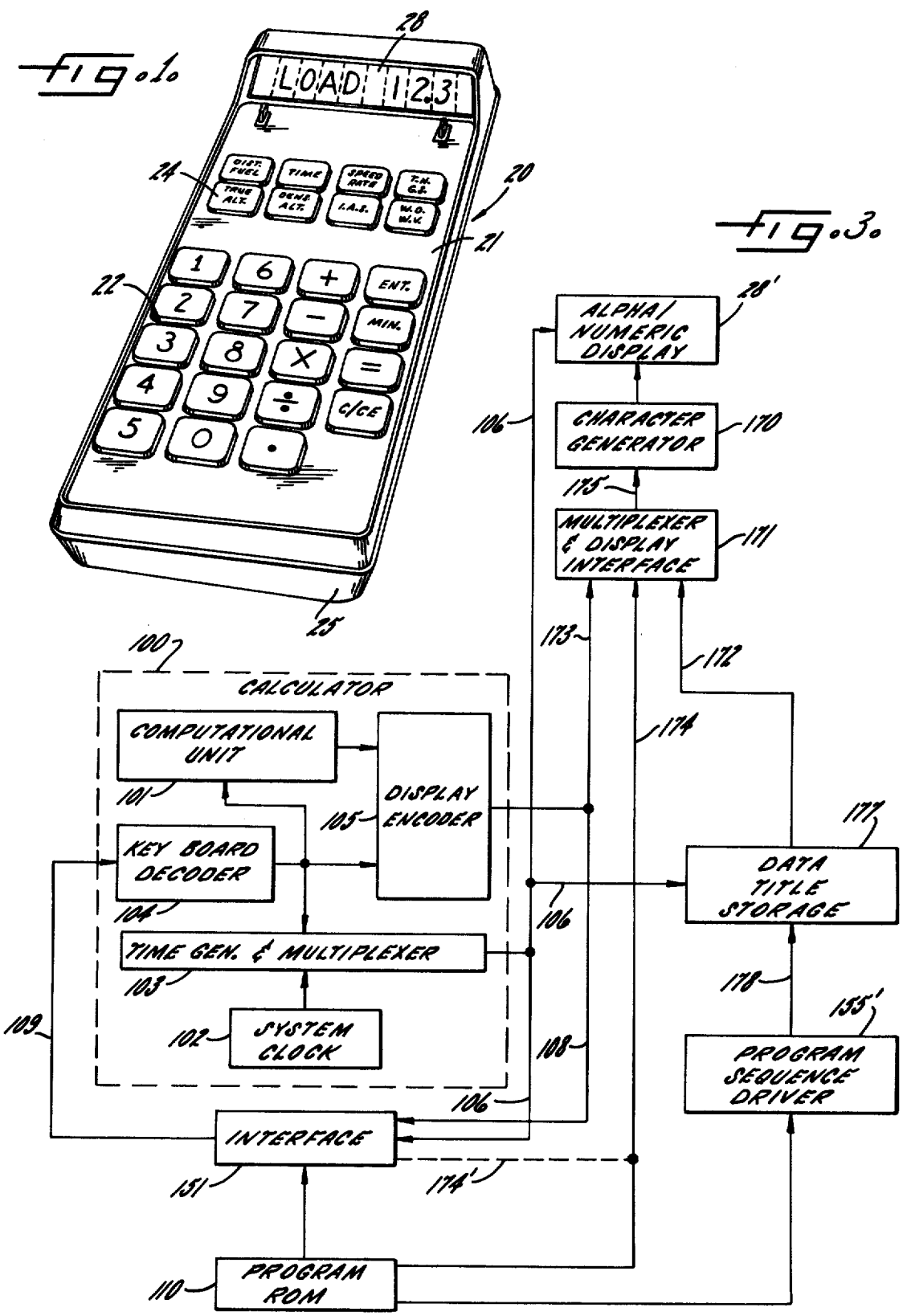
FIG. 1 is a perspective view of a programmed calculator including operator prompting means exemplifying the present invention.

Turning now to the drawings, FIG. 1 shows an electronic key operated calculator generally indicated at 20 including a housing 25 adapted to be hand-held, a keyboard section 21 and a display 28. The keyboard section 21 includes an array of data entry keys 22 and a second array of program selector keys 24. As will become more apparent, depression of a program selector key within the field 24 is effective to select one of the programs stored within the calculator 20, switching control of the calculator to the internal program storage means and causing the calculator to sequence through the steps necessary to calculate the desired result. Certain of the steps of each of the stored programs requires the manual entry of data via the data entry keys within the field 22. In accordance with the invention, the operator is prompted at the time the program sequences to a step requiring the manual entry of data, such prompting being accomplished by displaying upon the readout 28 a data title related to the particular entry required by the program. For example, FIG. 1 illustrates the display of the data title "LOAD," a data entry which might be required in an engineering problem designed to calculate the deflection of a beam. As will be described below, the display 28 may be adapted to serve a dual function in displaying both data titles and numeric values (such as data entries, intermediate results, and final results). Alternatively, the display may be split with a first section devoted to display of data titles and a second section devoted to display of numeric data.

CALCULATOR INTERNAL STRUCTURE (FIG. 2)

Figure 2:
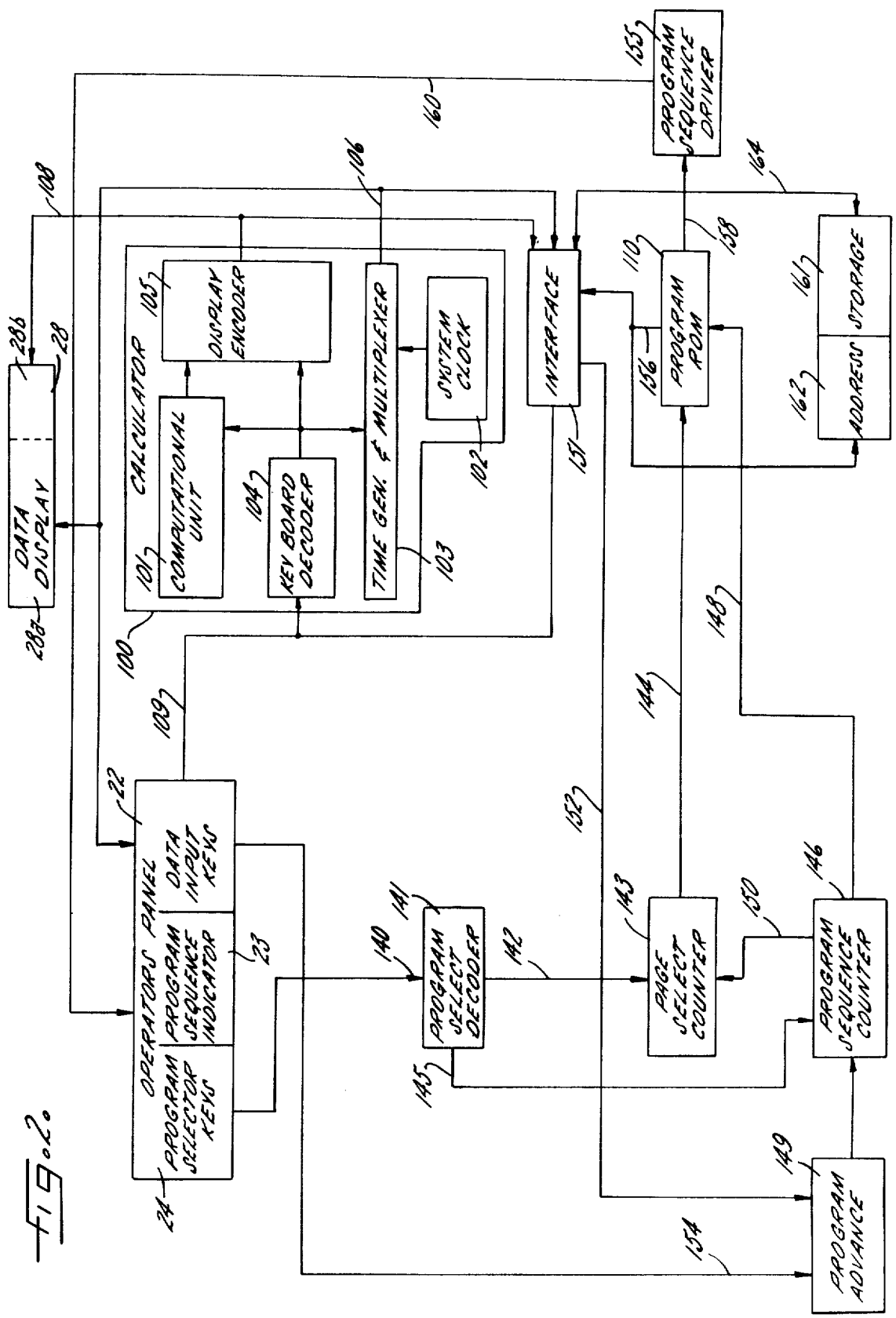
FIG. 2 is a block diagram of a calculator adapted to be programmed for special purpose applications and to cue the operator to enter data during such program.

FIG. 2 shows a block diagram illustrating the internal structure of a calculator including operator prompting means exemplifying the present invention. It will be noted that FIG. 2 is a reproduction of FIG. 2 of the above-identified copending application. The specification of said copending application is incorporated by reference herein.

Calculator Module and Related Components

There is shown in FIG. 2 a block diagram illustrating the internal structure of a programmed calculator capable of operation in the mode described above. The FIG. 2 embodiment includes a prompting display shown as program sequence indicator 23, which is separate from the data display 28. As will be described below, the program sequence indicator 23 may be formed of a plurality of prompting lights associated with respective nameplates including data titles. Alternatively, a separate alpha or alpha/numeric display, such as those of the dot matrix variety, may be incorporated.

For performing the necessary, mathematical calculations and manipulations, calculator means are provided, shown herein as an electronic calculator circuit 100. In the exemplary embodiment, the calculator means is implemented using commercially available scientific calculator arrays produced by Mostechnology, Inc. of Morristown, Pa., and identified by the part numbers MPS 2525-001 and MPS 2526-001. The structure and operation of the calculator means is fully described in a publication available from Mostechnology entitled "Specification for Scientific Calculator Arrays MPS 2525-001, MPS 2526-001," the second revision of which is dated Jan. 7, 1974. However, for an understanding of the invention, the following brief description will suffice.

The calculator module 100 includes a computational unit 101 adapted to perform the arithmatic operations of addition, subtraction, multiplication and division, as well as trigonometric, exponential, logarithmic and reciprocal functions. The calculator module 100 further includes a system clock 102 driving a time generator and multiplexer 103 adapted to control the interactions between the units of the calculator 100 and also the external components. Completing the illustrated components of the calculator 100 are a keyboard decoder 104 and a display encoder 105. The arrows interconnecting the internal units show the general data flow as well as the overall organization of the calculator means.

The input/output structure of the calculator comprises a matrix arrangement which is time dependent under the control of the system clock 102. First and second matrices having one common axis emanate from the calculator means 100 to form respective intersections at the data input keys 22 and the data display 28 respectively. The common axis for the two matrices comprises output lines 106 coupled to the data display and data input keys in parallel as shown. The illustrated line 106 comprises 14 individual wires driven by time generator and multiplexer 103. The time generator and multiplexer is adapted to provide pulses on the respective lines in sequence thereby to sequentially activate each line. A series of 8 output lines, illustrated as line 108 couple the display encoder 105 to the data display 28. The lines 106 and 108 form a matrix at data display for sequentially driving each of the digits to show the numerals selected by lines 108.

A series of four input lines, illustrated as line 109 couple the data input keys 22 of the keyboard to the keyboard decoder 104 of the calculator 100. The lines 109 form the second axis of the keyboard matrix and are adapted to provide inputs to the calculator indicating the identity of any depressed key thereon. The keys within the keyboard are arranged at intersections of the matrix so that the particular time relationship of a pulse as determined by one of the 14 lines 106 appearing on one of the input lines 109 identifies a particular key, thereby allowing the calculator to respond to such key.

Program Control and Selection Components

In practicing the invention, a program director is provided for controlling the overall operation of the calculator, shown herein as program ROM 110. The ROM is arranged as a cubic array for storing a series of instructions in sequential locations necessary to perform each of the programs within the repertoire of the calculator.

For selecting the individual programs within the ROM, a plurality of program selector keys are provided on the operator's panel of the computer, and are coupled via interconnection 140, to a program select decoder 141. The decoder 141, upon the detection of the actuation of one of the program selector keys performs a dual function. The decoder recognizes which of the keys has been actuated, and in response thereto couples a unique address associated with the selected program onto four address lines illustrated as interconnection 142. As a result, a page select counter 143, receiving the address information is adapted to couple a signal onto the four address lines illustrated by interconnection 144 to select the initial page in the ROM 110 on which the selected program is stored. Simultaneously with the selection process, the program select decoder produces a pulsed signal on line 145 which is coupled to a program sequence counter 146, and adapted to reset the counter. Four address lines, illustrated as interconnection 148 coupling the program sequence counter to the program ROM are adapted to select individual words within the page selected by the page select counter 143. As the program sequence counter 146 has been reset by the signal provided by the program select decoder 141, the first word in the selected page is addressed, thereby addressing the first instruction in the selected program. For sequencing through the individual steps of a selected program, a program advance module 149 is provided. Such module may comprise a timing circuit adapted to establish the overall program timing of the computer, such time being sufficient to allow the calculator means 100 to perform the necessary operation between successive advances of the major program clock. The program advance module 149 is activated upon the initiation of a program to clock the program sequence counter 146 at a preset rate. Accordingly the address on output lines 148 is advanced in a binary fashion, while the address on lines 144 is maintained constant in order to sequentially address the respective step storing words in the selected page of the program ROM 110. In the event a program comprises more steps than words in a page, the program steps may be stored on sequential pages. To accommodate such a situation, the program sequence counter 146 is coupled to the page select counter 143 by means of interconnection 150. Such interconnection allows the program sequence counter, having reached the limit of its count to increment the page select counter 143 while resequencing to a zero count within the program sequence counter 146. Accordingly, the program is sequenced to the first word in the next sequential page thereby allowing the stored program to continue.

As will become more apparent, certain of the steps stored in the program ROM 110 require the manual entry of data via the data input keys 22. In order to allow for such data entry, the program advance module 149 must be disabled for a time sufficient to enter the data. To accomplish this result, the CPU interface 151, which will be described in more detail below, is interconnected to the program advance module 149 by a line 152. Such line is activated in the event the program ROM 110 sequences to a step requiring the manual input of data; and is effective to disable the program advance module 149, thereby preventing further program sequencing. A data entry is performed in conventional fashion by actuating the proper numerical keys upon the keyboard 22 followed by a depression of the enter key. A connection 154 coupling the keyboard 22 to the program advance module responds to the depression of the enter key to re-enable the program advance module 149 to allow the program to continue after the entry of the necessary data.

Calculator Control Via the Program ROM

Having thus described the sequencing of the program ROM 110, attention will now be directed to the outputs from the ROM which are adapted to act upon interface 151 to control the calculator means and also to act upon the program sequence driver 155 to control the program sequence indicators 23 which form part of the operator's panel of the computer. As illustrated, a series of output lines indicated as interconnection 156 couple the program ROM to the interface, and a second series of output lines illustrated as interconnection 158 couples the program ROM to the program sequence driver. In the illustrated embodiment, the output lines of the ROM are segregated to form grouped interconnections 156, 158, thereby allowing certain bits within each memory word to control the interface while dedicating other bits within each word to control the sequence indicators. It will therefore be apparent that coupling the proper 8 bit address to the program ROM, via the 4 bit page address on lines 144 and the 4 bit word address on lines 148 will transfer control of each of the output lines 156 through 158 to associated addressed bits for readout of the instruction contained therein.

The interface 151 responds to the instructions on lines 156 to cause the calculator means 100 to perform the calculation or manipulation contemplated by the particular instruction provided by the ROM 110. In effect, the interface 151 "pushes the buttons" of the calculator, causing it to manipulate data and perform calculations. As noted with reference to the operation of the keyboard 22, and the description of the timed matrix arrangement for entering data and instructing the calculator, the calculator is controlled by a 14 × 14 timed matrix arrangement. Additionally, the four lines forming the second axis of the input matrix are coupled to the interface in parallel fashion as illustrated. Accordingly, the interface internal circuitry is adapted to cross points within the matrix provided thereto to cause the calculator to perform any operation which might normally have been caused via the keyboard. However, such points are crossed in response to the instruction received on lines 156, thereby providing the program ROM with the complete capability to control the calculator.

Program Sequence Indicator

In practicing the invention, the program ROM 110 not only acts through the interface 151 to control the calculator 100, but also drives the program sequence indicator to appraise the operator of the need for a manual data entry and the nature of the entry required. In the exemplary embodiment, such function is accomplished under the control of output lines 158 coupling the program sequence driver 155 to the program ROM 110. In one embodiment, the lines 158 carry a BCD address for selectively illuminating individual ones of a plurality of prompting lights on the operator control panel. The program sequence driver 155 then comprises a one of 16 decoder and the necessary drivers for decoding the address on lines 158 and driving the addressed indicator via one of the 12 lines illustrated as interconnection 160. It will be appreciated that the lines 158 are normally maintained in an inactive condition thereby preventing the illumination of any of the indicators, such lines being energized only in conjunction with a program step requiring the manual entry of data.

Intermediate Data and Program Storage Elements

In order to retain intermediate results and data entries which might be required in subsequent programmed steps, means are provided to temporarily store such data thereby to minimize the number of required data entries. A first easily accessible memory means is provided by the calculator 100 itself. Memory is accessed in a straightforward manner with simple store or retrieve instruction contained in the proper instruction steps in the program ROM coupled to the calculator by means of the interface. In the illustrated calculator, however, only a single storage register is provided. As will become more apparent, certain of the programs require storage of two or more words of data simultaneously during the program sequence. Accordingly, additional temporary storage is provided by supplementary storage register 161 having an associated address generator 162. As illustrated in the drawing, the address generator 162 is coupled to the program ROM 110 via lines 156 in parallel with the interface 151. Accordingly, certain of the program steps are adapted to set or select an address within address register 162. Input and output to temporary storage is provided by lines 164 coupling the interface 151 to the storage register 161. Interconnections 164 may efficiently comprise four lines for transferring BCD digits between the interface and storage elements. It will be appreciated, however, that data normally transmitted to the calculator is in the time related matrix format described above, while data to be stored in a temporary storage must be provided in some non time related code such as BCD. Accordingly, the interface 151 is provided with means for decoding the output of the calculator which is in time related matrix format and producing a BCD representation thereof for coupling to the storage 161. To that end, the display encoder 105 within the calculator 100, which it is recalled controls one axis of the data display matrix, is also coupled to the interface. Accordingly, circuitry within the interface acts in a similar fashion to the display to accept output data from the calculator. Such accepted output data is encoded in BCD and coupled to the storage 161. In a similar fashion, data read from the storage 161 to the interface 151 is in BCD format, the interface, in conjunction with the timed signals received on lines 106 is adapted to produce the proper signals on lines 109 (the second axis of the input matrix) for communicating with the calculator in input data format. Thus, according to this aspect of the invention, the interface acts similarly to the display in receiving data from the calculator, and similarly to the keyboard for coupling data to the calculator.

Result Display Circuits

Certain of the programs stored within the program director 110 may be adapted to provide a dual result; in the case, the data display 28 may be segmented into sections 28a and 28b to simultaneously display both results. The illustrative circuitry provides several means for accomplishing this split screen display function. Initially, it should be noted that the illustrated calculator chip 100 has the capability to calculate in and display scientific notation. This feature may be used to display the two-part result by controlling the calculator via the stored program and interface means to treat the first result as a mantissa and the second result as an exponent thereby causing the simultaneous display of both results. It is noted, however, that this technique is limited and that the calculator may only display a two digit exponent. As a result, other techniques must be used when both of the results in a dual result problem are larger than two digits.

A second technique contemplates a program of simple calculation for assembling the dual result into a unitary data word. Program steps exemplifying this technique would involve temporarily storing the second result in memory, operating upon the first result to multiply it by 1000, retrieving the second result from memory and adding it to the multiplied first result, and causing the display of the sum.

A final technique, which as all the others is under the control of the stored program, involves the temporary storage of both results in supplementary storage memory 161 in locations controlled by the steps stored in the program director 110. Having stored both results, the program director 110 then causes the sequential readout of those results into the interface 151 and thereby into the calculator 100 in such an order as to assemble a composite data word for display containing both results.

Finally, it is noted that the computer has the capability to perform as a normal calculator when not using the programmed mode of operation. It will be appreciated that this function is implemented in the block diagram of FIG. 2 using the normal keyboard matrix coupling the keyboard 22 and calculator 100 via the first axis line 106 and the second axis input lines 109. It is presently contemplated that sufficient flexibility will be achieved by providing addition, subtraction, multiplication and division functions. However, it should be noted that further features, extending to the full capabilities of the calculator may be achieved by providing additional keys at the necessary matrix cross point.

Cueing With Prompting Lights

In accordance with the invention, operator prompting means are provided for indicating in conversational language the data titles associated with required data inputs at the time such data inputs are required in the program. To that end, in the illustrated embodiment the program sequence driver 155 is responsive to the program ROM 110 for driving the program sequence indicator 23. In the simplest embodiment, the program sequence driver 155 comprises a series of decoders while the program sequence indicator 23 comprise a series of indicators with associated legends in an arrangement similar to that described in the aforementioned copending application. However, it should now be apparent that the program ROM 110 may be structured to perform other than navigational problems, and the legend associated with the program sequence indicators 23 be arranged to indicate the data titles associated with other than navigational problems.

Cueing With Separate Readout

In an alternative arrangement, the program sequence indicator 23 may comprise an alphabetical or alpha-numeric readout, electronically driven to illuminate the data titles in conversational language. It should be noted that conversational language, when used herein, is intended to encompass indication of the nature of the data entry by words or abbreviations commonly associated with such entries, as opposed to lettered or numeric codes assigned to such entries. The program sequence indicator display 23 may comprise a commercially available dot matrix display formed of an array of LEDs driven by suitable circuitry to illuminate selected LEDs within the matrix to show any desired character. A plurality of dot matrix displays are provided to allow the formation of words or abbreviations therefor. Other forms of display, such as multibar displays may also be utilized. In such applications, the program sequence driver 155 is provided with the necessary character generator or decoder to operate in conjunction with the commercially available display module for responding to the program ROM instructions to display the necessary characters.

OPERATOR CUEING THROUGH THE DATA DISPLAY — CONTROLLER DRIVEN (FIG. 3)

Turning now to FIG. 3, there is shown an embodiment of the invention utilizing a single alpha-numeric display for showing both data titles for use in cueing and numeric values such as data entries and calculated results. It should be noted that FIG. 3, and similarly FIG. 4, do not show a complete embodiment, merely illustrating the portions of the block diagram of FIG. 2 related to driving of the display. The calculator 100 includes the computational unit 101, system clock 102, time generator and multiplexer 103, keyboard decoder 104 and display encoder 105 as in the FIG. 2 embodiment. Similarly, the program ROM 110 and interface 151 control the calculator 100 as described above.

In contrast with the FIG. 2 embodiment, and in practicing the invention, the readout comprises an alpha-numeric display 28' arranged to display both numeric computational values and data titles for cueing. The alpha-numeric display 28' may comprise a LED type dot matrix readout as described above. Such display is driven by a suitable character generator 170 adapted to provide driving signals to the various LEDs within the matrix for illuminating selected LEDs to form the desired characters. The alpha-numeric display 28' also receives an input via lines 106 as in the previous embodiment. Such input acts as a digit selector, providing driving signals to the various digits in sequence which, in conjunction with the signals provided by character generator 170, serves to control the entire display.

In order to provide selection under program control between calculated results and data titles for display, a two input multiplexer 171 is provided having a first input 172 for receiving signals related to numeric results. A control input 174 selects one or the other of the inputs 172 or 173 and couples such signals via the output 175 to the character generator 170.

For displaying data titles for use in operator cueing, means are provided responsive to the program ROM for driving the alpha-numeric display, shown herein as program sequence driver 155' and data title storage module 177. The data title storage module 177 is merely a memory element containing digital data related to the characters within the repertoire of messages to be displayed for operator cueing. A particular message is selected under the program contained within the program ROM 110 acting through the program sequence driver 155' which imposes an address signal upon the data title storage module 177 via interconnection 178. Thus, when the program within the program ROM 110 sequences to a step requiring the manual entry of data, the particular program step is sensed by the program sequence driver 155' which couples an address signal via line 178 to the data title storage module 177 for addressing the area within such storage module containing the desired characters. The data title storage module 177 is sequenced in conjunction with the digits within the alpha-numeric display via lines 106 driven by the timing generator and multiplexer 103 within the calculator 100. Thus, the individual characters within the alpha-numeric display 28' are driven to indicate the selected message stored within the data title storage module 177 under the control of the program within the program ROM 110.

The character generator 170 is also effective to drive the alpha-numeric display 28' to display calculated results, intermediate results, or data input via the numeric keys, such data being provided via the calculator 100. Accordingly, the display encoder 105 within the calculator 100 is coupled via line 173 to the multiplexer and display interface 171. The particular calculator means 100, requires interfacing circuitry within the multiplexer and display interface 171 for transforming the seven bar driving signals provided by the display encoder 105 into binary data capable of driving the character generator 170.

The display circuitry is selectively made responsive to the calculator 100 or to the data title storage module 177 via the signal provided on the multiplexer control input 174. Such input may be driven directly from the program ROM 110 as shown in FIG. 2. Alternately, gating circuitry within the interface 151 may be used to generate a control signal coupled to the multiplexer and display interface 171 via connection 174', shown dotted in FIG. 3.

OPERATOR CUEING THROUGH THE DISPLAY — CALCULATOR DRIVEN (FIG. 4)

FIG. 4 shows a final alternate embodiment wherein the calculator 100 serves to produce both the numeric results and the data titles for driving the alpha-numeric display 28'. The calculator 100, interface 151 and program ROM 110 shown in FIG. 4 are identical to those shown in FIGS. 2 and 3. Similarly, the character generator 170' is compatible with the particular form of alpha-numeric display 28' for producing signals for driving the individual LEDs within the readout matrix in conjunction with the digit selector signals on line 106 for illuminating the display to show desired messages. In the system shown in FIG. 4, the program ROM 110 acts through the interface 151 upon the calculator module 100 to display intermediate results, etc., as in the previous embodiment. However, in the FIG. 4 embodiment, the program ROM 110 also acts through the interface 151 to cause the calculator module 100 to generate operator cueing messages. Accordingly, the multiplexer 171 of FIG. 3 is eliminated and all display messages are passed through the calculator module 100. The character generator 170' in the FIG. 4 embodiment may include circuitry for decoding the seven bar output of display encoder 105, or may respond to such seven bar output directly. As a final alternative, the display signals may be passed through the interface 151 and coupled to the character generator 170', thus coupling all display messages through the interface 151 which, it is recalled, contains circuitry responsive to the seven bar driving signals for producing a binary signal related thereto.

It will now be apparent that what has been provided is an operator prompting system for a special purpose calculator, allowing the calculator to be manufactured in a manner which allows the basic unit to be easily modified to suit a desired one of a plurality of special purpose applications, such as mathematical, engineering, financial, scientific or navigational uses. Operator prompting may be accomplished using a plurality of prompting lights associated with respective data titles, the lights being selectively illuminated to show the need for and the nature of a required data input. Alternatively, an alpha or alpha/numeric display may be provided to show the data title under program control, thereby allowing the data titles to be electronically generated. Finally the data display, itself may be configured to serve the dual purpose of displaying numeric data and also data titles for use in operator prompting.

We claim as our invention:

1. In a self-contained electronic computer for mathematical problems having: a housing including a plurality of data input keys, a plurality of program selector keys, a visual numerical display, calculator means for performing mathematical operations, a stored program controller, said controller having a plurality of programs stored therein for solving a plurality of mathematical problems, each of said programs comprising a routine of program steps, means coupling the controller to the calculator means for causing said calculator to perform the mathematical operations indicated by said program steps, at least some of said program steps requiring the manual entry of data during the course of the program via the data input keys of said keyboard, means coupling said program selector keys to said controller for selecting associated ones of the programs stored in said controller, an operator prompting system comprising means for visually indicating in conversational language with data titles the individual types of data to be entered during said programs, and means for driving said indicating means and operative in conjunction with said program steps requiring manual entry of data for displaying selected ones of said data entry titles to prompt the operator as to the type of data required by said program steps, whereby selection of a program is effective to cause said computer to demand the necessary input data in sequence and manipulate said data to calculate the desired results.

2. An operator prompting system according to claim 1 wherein said indicating means includes a plurality of indicator lights mounted on a section of the housing adjacent said keys, each light having associated therewith a printed title fixed on said section of the housing.

3. An operator prompting system according to claim 2 wherein said indicating means includes an alpha LED display for displaying said titles and said calculator includes a numeric LED display for displaying the calculated results.

4. An operator prompting system according to claim 3 wherein said alpha LED display and said numeric LED display are served by a common dual function unit.

5. An operator prompting system according to claim 1 wherein said indicating means includes an alpha LED display for displaying said titles.

6. An operator prompting system according to claim 1 wherein said indicating means includes an alpha/numeric display for displaying said titles, said indicating means being coupled to said calculator for displaying calculated results on said alpha/numeric display.

7. An operator prompting system according to claim 6 wherein said alpha/numeric display is divided into first and second sections, said first section being adapted to display data titles, said second section being adapted to display calculated results.

8. An operator prompting system according to claim 6 wherein said alpha/numeric display includes a plurality of individual digit spaces, said digit spaces being adapted to display both data titles and calculated results under the control of said stored programs.

9. An operator prompting system for electronic key operated calculators having a housing adapted to be hand held, a keyboard section including input and program selector keys on the top of the housing, a program storage device mounted inside the housing containing a plurality of programs for solving mathematical problems and calculating means mounted inside the housing controlled by said storage device for performing calculations and connected to a display for displaying results, said prompting system comprising:

1. means on the top of the housing adjacent said keyboard section for visually indicating in conversational language with data titles individual types of data to be entered during a program,
2. means coupling said program storage device and calculating means to said indicating means for driving said indicating means responsive to program steps in a stored program requiring manual entries of data to indicate the nature of the entries required, thereby to prompt an operator as to the need for and nature of a data entry when the entry is required.

* * * * *